United States Patent
Gherardini et al.

(10) Patent No.: US 7,195,513 B1
(45) Date of Patent: Mar. 27, 2007

(54) SELF-LOCKING WIRE TERMINATION CLIP

(75) Inventors: Stephen D. Gherardini, Harrisburg, PA (US); Christopher G. Daily, Harrisburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/427,125

(22) Filed: Jun. 28, 2006

(51) Int. Cl.
*H01R 11/20* (2006.01)

(52) U.S. Cl. .................................. 439/401; 439/402

(58) Field of Classification Search ......... 439/395–410
See application file for complete search history.

(56) References Cited

U.S. PATENT DOCUMENTS

| | | | | |
|---|---|---|---|---|
| 3,634,605 A | * | 1/1972 | Dola ........................ | 174/88 R |
| 3,804,971 A | * | 4/1974 | Bazille, Jr. ............... | 174/88 R |
| 4,192,570 A | * | 3/1980 | Van Horn .................. | 439/402 |
| 4,252,395 A | * | 2/1981 | Ward et al. ................ | 439/402 |
| 4,283,106 A | | 8/1981 | Bunnell | |
| 4,310,211 A | | 1/1982 | Bunnell et al. | |
| 4,323,450 A | * | 4/1982 | Arthur ....................... | 210/115 |
| 4,324,450 A | * | 4/1982 | Weisenburger et al. ..... | 439/400 |
| 4,391,484 A | * | 7/1983 | Foederer .................... | 439/404 |
| 4,457,578 A | | 7/1984 | Taylor | |
| 4,496,206 A | * | 1/1985 | Markwardt et al. ........ | 439/409 |
| 4,597,623 A | * | 7/1986 | Krumreich ................ | 439/404 |
| 5,513,075 A | | 4/1996 | Capper et al. | |
| 5,562,478 A | * | 10/1996 | Yamamoto ................. | 439/402 |
| 5,759,065 A | * | 6/1998 | Hatagishi et al. .......... | 439/596 |
| 6,179,639 B1 | | 1/2001 | Kuwahara et al. | |
| 6,203,354 B1 | | 3/2001 | Kuwahara et al. | |
| 6,981,890 B2 | * | 1/2006 | Cutler et al. ............... | 439/441 |
| 2005/0227529 A1 | * | 10/2005 | Mrakovich et al. ........ | 439/402 |

* cited by examiner

*Primary Examiner*—Ross Gushi

(57) ABSTRACT

A solar grounding connector for capturing a wire. The connector includes a base and a stuffer. The base is made from a conductive metal and includes a base plate. The base plate includes means for assembling the base to a solar panel. A pair of opposed sidewalls extend at an angle from the base plate, each sidewall including a slot of preselected size. The stuffer is pivotably mounted to the base. The stuffer includes a top surface, and a pair of opposed sidewalls extending from the stuffer top surface toward the base plate. Each stuffer sidewall has a slot corresponding to the slot in the base sidewall, each opposed stuffer sidewall being adjacent to a base sidewall when engaged. The slot in the stuffer sidewalls urge a wire against the corresponding slots in the base sidewalls, exerting a force on the wire sufficient to establish electrical contact between the wire and the base. The grounding connector also includes means for fastening the stuffer with respect to the base. The solar grounding connector is attached to a solar panel frame, while the wire has one end connected to ground.

19 Claims, 3 Drawing Sheets

SELF-LOCKING WIRE TERMINATION CLIP

FIELD OF THE INVENTION

The present invention is directed to a connector for a solar module that connects wire on a solar panel, while establishing a reliable electrical contact between the panel frame, the wire and ground.

BACKGROUND OF THE INVENTION

Various connection devices are available to establish electrical contact between an electrical wire and a solar panel. Solar panels themselves are photovoltaic devices that convert incident solar radiation from the sun into electrical energy. Each solar panel comprises a plurality of modules typically connected in series within a frame. A plurality of panels may be connected together to form a solar panel array. The plurality of modules are connected together to form a solar panel, and a plurality of solar panels are connected together to form a solar panel array. When connected in series, the voltages of the modules are additive. Of course, diodes typically are included in such solar panels arrays to permit the flow of electrical energy in only one direction, thereby preventing damage to the panel.

An electrical connector that is mounted on or adjacent to a solar panel enables and facilitates the connection of the panel to ground, completing an electrical circuit from the panel to ground. While various grounding connectors are utilized, one of the most utilized is the copper lug design. This prior art design is shown in FIG. 1. The copper lug is relatively simple, comprising a C-clamp shape having a horizontal extension. The copper lug itself is extruded. Two apertures are located in the extrusion, the first located in the top of the C-portion of the clamp and the second in the horizontal extension. The second aperture on the horizontal extension allows the lug to be assembled to the solar panel, establishing electrical contact between the solar panel and the lug, a screw passing through the second aperture fastening the lug to the panel. A flat-bottomed screw passes through a threaded hole in the first aperture. The wire that connects two or more arrays is passed through the cradle in the "C" of the C-clamp. The flat-bottomed screw is then turned down onto the wire to capture the wire in the base of the "C". While of simple design, the assembly of the wire to the C-clamp is labor-intensive. Each clamp must be assembled to the solar panel frame, the wire passing through the cradle in the C-clamp must be stripped and the flat-bottomed screw must be torqued against the stripped wire to establish a firm electrical connection with the wire.

One potential problem with this design is that the flat-bottomed screw can work its way loose, even when properly torqued during initial assembly. The temperatures experienced by a solar panel can vary significantly, not only from day to night, but also as clouds block solar energy from the sun. The repeated differential thermal expansion among the screw, the wire and the lug can cause the stresses among these parts to be relieved. Over a period of time, if sufficient movement occurs, the electrical contact can become intermittent or can cease to exist. In addition, if the screw used to fasten the lug to the solar frame is of a metal that is not compatible with the lug, galvanic corrosion can occur which could result is a loosening of the lug from the solar frame, which also can result in an intermittent contact.

What is required is a simple connection that permits the assembly of a connector to a solar module frame and rapid assembly of a wire to the connector, thereby allowing solar frame or plurality of frames to be grounded rapidly and reliably.

SUMMARY OF THE INVENTION

The present invention is a solar grounding connector or clip comprising a base and a top piece or stuffer pivotally mounted to the base. The base itself includes a base plate, and a pair of opposed sidewalls extending at an angle from the base plate. The base plate includes means for assembling the base to a solar module, here the means being an aperture/screw combination. The base is a conductive metal so that good electrical contact is established between the solar panel frame and the base, upon assembly. Each wall of the opposed sidewalls includes a slot. Each slot is sized to receive a wire of preselected size. One end of the wire is connected electrically to "ground." The slot diameter, that is, the distance from one side of the slot to an opposed size is determined by the wire size that is to be inserted into it. The wire size may be a function of the electrical potential that is anticipated for grounding. The solar grounding clip slot size preferably is sized about the same as the size of the wire or smaller. For example, when a 12-gauge wire is utilized, the connector base has a slot size of about 0.080" (80 mils) or smaller, allowing the connector to penetrate insulation and establish good electrical contact. The slots are capable of providing an insulation displacement crimp to a properly sized wire. The wire extends across the base and through the slot in each sidewall. The depth of the slot, that is, the distance from the top of a sidewall to the bottom of the slot, which is essentially transverse to the slot diameter, may be the same size as the slot diameter or may be larger. When the same size as the slot diameter, the slot has essentially a circular configuration. As the slot depth increases, the slot configuration becomes more oblong.

The solar grounding clip also includes a stuffer pivotally mounted to the base. The stuffer can be pivoted from an open position in which a wire can be assembled into the base to a closed position in which an assembled wire is captured in the slots. The stuffer comprises a top surface and a pair of opposed sidewalls extending from the top surface. The distance between the side walls of the stuffer is slightly greater than the distance between the side walls of the base so that when the stuffer is pivoted from the open position to the closed position, the sidewalls of the stuffer close freely without interference from the base, the stuffer sidewalls and the base side walls being adjacent to each other on closing.

Each stuffer sidewall also includes a slot whose position corresponds to the position of the slot in each base sidewall. This slot is designed to contact the wire of preselected size assembled across the base sidewall. Thus, as the stuffer is pivoted from an open position to a closed position, the stuffer contacts the wire and "stuffs" the wire into the slots in the base sidewalls. As this "stuffing" action, which captures the wire between the base sidewalls and stuffer sidewalls, exerts a force on the wire, a counteracting force is exerted on the stuffer. To maintain the stuffer in a closed position, a locking arrangement locks the stuffer with respect to the base so that the wire is retained by the solar grounding clip, so there is some resistance to the wire being pulled "up" and then out of the clip.

Since the slots provide an insulation displacement crimp, the wire does not require stripping. The force imposed by the stuffer on the wire as it is pivoted from its first open position to the second closed position strips a wire having an insulation layer. Importantly, the wire is also slightly deformed against the base slots in at least two points of each slot, thereby establishing a reliable electrical contact. Finally, once the stuffer is locked with respect to the base, the wire is captured so that the electrical contact cannot be compromised by thermal expansions and contractions from heating and cooling as exposure of the solar panel to the sun fluctuates.

An advantage of the present invention is that time consuming labor operations using known methods of assembling and grounding a solar panel or array of solar panels are removed. Specifically, the time consuming tasks of stripping wire, placing wire into the lug and affixing wire to the lug are removed and replaced by placing wire into slots in a base and closing a stuffer against a base.

Another advantage of the present invention is that locking of the stuffer against the base locks the wire in place, so that the wire cannot be accidentally or inadvertently loosened.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
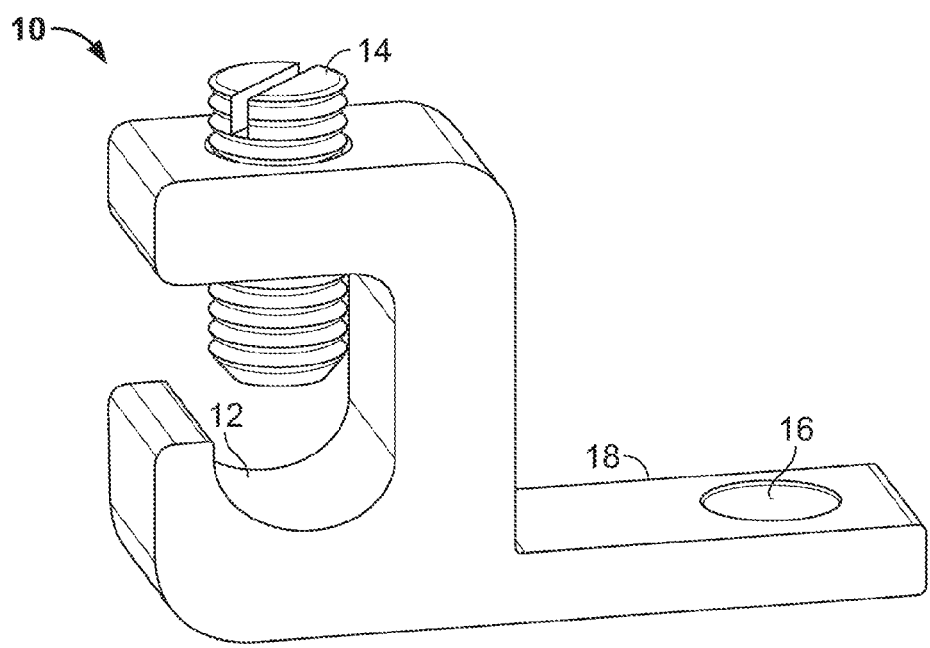
FIG. 1 depicts a prior art copper lug arrangement.

FIG. 1 depicts a prior art copper lug 10 used to provide an electrical path between solar panel frames and ground. At least one lug 10 is fastened to solar panel frames and connected by a wire to, for example, a grounding rod to provide grounding. A wire (not shown) is placed into the "C" portion 12 of a C-clamp and fastened to the lug by tightening a flat bottom screw 14 against the wire. The lug 10 is assembled to the solar panel frame by means of a screw passing through an aperture 16 in a horizontal extension 18.

Figure 2:
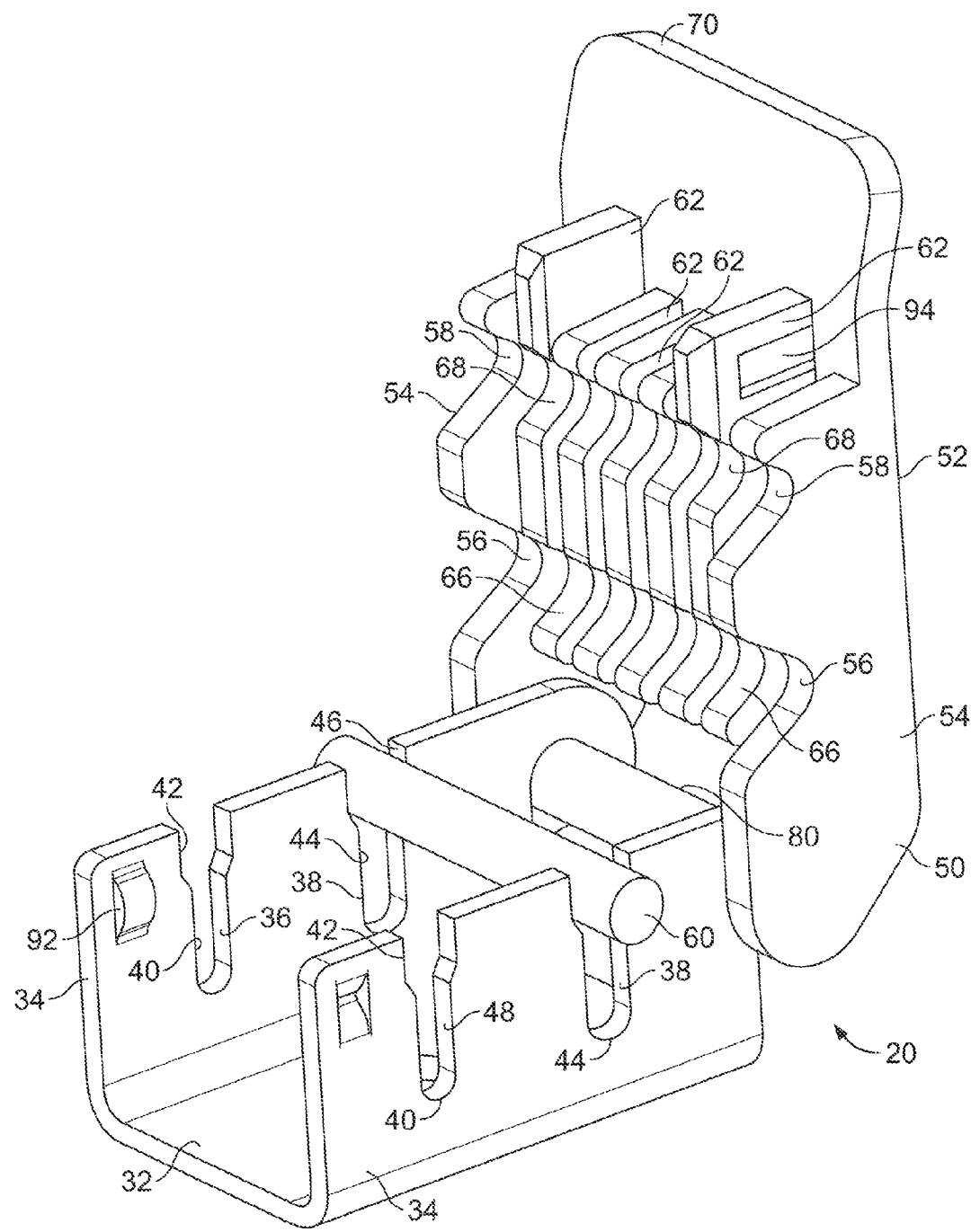
FIG. 2 is a perspective view of a solar grounding clip of the present invention in the open position.

The solar grounding clip 20 of the present invention is depicted in FIG. 2 in a first or open position. The clip comprises a base 30 and a stuffer 50 pivotally mounted to the base 30. The base further comprises a base plate 32 and a pair of opposed sidewalls 34 extending at substantially right angles away from the base plate 32. The sidewalls include a first pair of opposed slots 36 and a second pair of opposed slots 38. The base plate 32 and sidewalls may be a stamped metal part. Typically they are comprised of a tin-plated copper alloy that can establish a good electrical contact when properly assembled to a solar panel frame.

Figure 3:
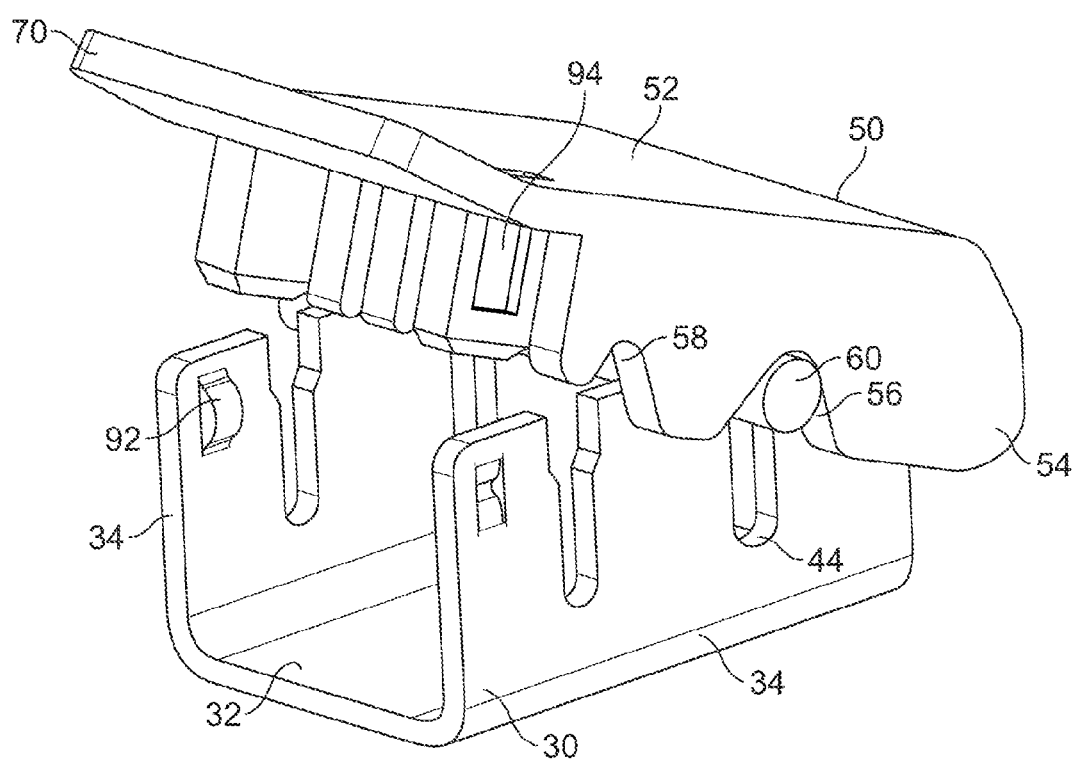
FIG. 3 is a perspective view of a solar grounding clip of the present invention in a partially closed position.
Figure 4:
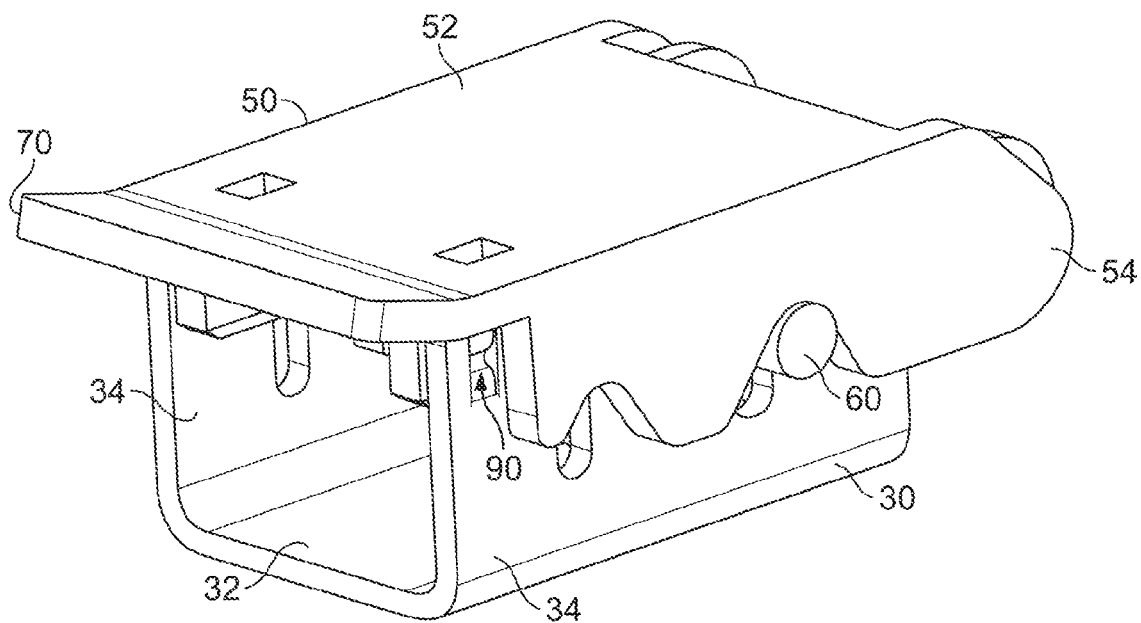
FIG. 4 is a perspective view of a solar grounding clip of the present invention in the closed or fully engaged position.

In the embodiment shown in FIGS. 2–4, the first pair of slots 36 includes a lower U-shaped opening 40 and a second upper width opening 42, the second upper width opening 42 being greater than the lower width opening 40. The second pair of slots 38 includes a lower U-shaped opening 44 and a second upper width opening 46, the second upper width opening 46 being greater than the lower width opening 44. Also, as shown in FIG. 2, one of the upper width openings, here second upper width opening 46, is wider or has a greater opening than the other upper width opening 42.

As shown in FIG. 2, a wire 60 extends across second pair of opposed slots 38, the wire fitting into second upper width opening 46, which is sized to receive wire 60. First pair of slots 36 have second upper width openings sized to receive a smaller wire. Thus, one solar grounding clip 20 can be manufactured to receive one or more wire sizes. It is also possible to fabricate each pair of slots to accommodate more than one wire size. For example, one pair of slots could accommodate wire sizes from, for example, 10 gauge to 12 gauge. However, in a preferred embodiment, one solar grounding clip 20 can be manufactured to receive wires of two different sizes. For example, the small wire size may be selected based on grounding a single panel, while the larger wire size may be selected based on grounding a plurality of solar panel panels comprising a solar array. For a solar grounding clip made in accordance with the preferred embodiment, that is having two pair of slots, each pair sized to accommodate different diameter wires, the slot sizes may be in sized to accommodate any convenient gauge sizes, for example 10 gauge–12 gauge, 8 gauge–12 gauge, 10 gauge–14 gauge etc., the appropriate slot size being selected by the installer on installation.

Base 30 also includes a means for attaching the base to the solar panel frame. In FIG. 2, base plate includes an aperture 48 which receives a screw that is tapped into the solar panel frame. A self-tapping aluminum screw tapped into an aluminum frame of a solar panel is preferred, as this establishes very good electrical contact with the solar panel frame, not only between the base plate and the panel, but also among the aluminum screw, the panel frame and the base plate of the base. However, any other convenient means of securing the connector 20 to a solar panel that also provides a good electrical connection may be used. Thus, a preassembled latch assembly attached to the solar panel that secures the connector to the solar panel may be used. A crimp in which a portion of the connector is deformed against the panel may also be used. Although not practical since it is not cost efficient, a spot weld could also be used.

Stuffer 50 comprises a top plate 52, best seen in FIG. 3, a perspective view of the solar grounding clip of the present invention in the partially closed position, and FIG. 4, perspective view of the solar grounding clip of the present invention in a fully closed, or engaged, position. The stuffer can be made from any material, including a metal, such as the same material used for the base, but preferably is molded as a single piece of a resilient plastic that includes UV radiation inhibitors to retard deterioration from this source. While the top plate 52 can be a plate as shown, it can be an open frame with appropriately placed supports. It can assume any shape, as it is not restricted to being substantially flat as shown. The stuffer 52 includes a pair of sidewalls 54 extending at an angle from the top plate 52. When the stuffer 50 is assembled to the base 30, the sidewalls 54 of the stuffer extend downward toward the base 30, while the base sidewalls 34 extend upward toward the stuffer 50. The distance between the sidewalls 54 is such that they lie adjacent to the sidewalls 34 of the base when the clip is in the fully engaged position. As shown in FIGS. 2–4, the distance between the sidewalls 54 is slightly greater than the distance between the base sidewalls 34.

The stuffer 50 is pivotal with respect to the base 30. Any means for pivoting 80 the stuffer 50 with respect to the base may be used. As shown in FIG. 2, the stuffer includes a pivot pin 80 that extends between the base sidewalls. However, the pivot pin could be an element of the base extending from the base sidewalls 34 and the stuffer could be rotationally attached via apertures or groves to such a pivot pin. Alternatively, the pivot pin could be an element that is separate and distinct from either part held mechanically in place between the base sidewalls. Either the base sidewalls 34 or the stuffer sidewalls 54 could include protuberances that slide into apertures on the other part, thereby allowing the parts to pivot with respect to one another. It is also possible to accomplish assembly of the stuffer 50 to the base 30 to capture a wire without the use of a pivot, as discussed below.

The sidewalls 54 include a first set of grooves 56 and a second set of grooves 58 corresponding to the first slot pair 36 and second slot pair 38 in the base sidewalls 34. The sets of grooves 56, 58 are dimensioned to correspond to a wire 60 when inserted into one of the slot pairs 36, 38. The sets of grooves 56,58 contact the wire and apply a force on the wire as stuffer 50 is closed or engaged. This force is sufficient to permit any insulation to be penetrated by the insulation displacement crimp design of the slot pairs 36, 38 in the metallic base 30. The force is also sufficient to bias the wire 60 into an electrical contact with the metallic base and maintain the wires within the slots during the operational life of the solar module. As can be seen from FIG. 4, a properly assembled wire has at least two points of contact in each of the upper U-shaped openings when the solar grounding clip is in the fully engaged position. When properly assembled, the electrical contact between the metal wire 60 and the slot pairs may provide a surface contact that is more than merely point contact.

Referring again to FIG. 2, a plurality of ribs 62, at least two, extend downward from stuffer top plate 52. As shown in FIG. 2, the plurality of ribs are positioned between the stuffer sidewalls 54. However, if the stuffer sidewalls 54 are positioned so that the distance between them is less than the distance between the base sidewalls 34 so that the stuffer sidewalls 54 fall within the base sidewalls 34 when the solar grounding clip is fully engaged, then the at least two ribs are positioned to extend from the top plate 52 so that the ribs 62 fall outside the base sidewalls 34 when the grounding clip 20 is fully engaged. Each rib 62 includes sets of grooves 66, 68 corresponding to sets of groove 56, 58 in each of the sidewalls. The rib grooves 66, 68 contact wire 60 on one side of base sidewalls 34 and sidewall grooves 56, 58 contact wire 60 on the opposite side of base sidewalls 34. These grooves capture the wire on either side of the base sidewalls 34, so that a uniform downward force is applied to at least the portion of the wire contacting the base sidewalls in the upper width openings 42, 46, thereby assuring stripping of insulation, if present, and crimping of the wire in the upper width openings 42, 46 of the base sidewalls 34. The rib grooves 66, 68 and sidewall grooves 56, 58 also maintain a downward force on the wire while the solar grounding clip is in the engaged position, as shown in FIG. 4, thereby preventing wire 60 from separating from the engaged solar grounding clip.

The stuffer 50 also includes an optional lever 70. Lever 70, as best shown in FIG. 4, is an integral extension of stuffer top plate 52. Lever 70 is merely a means for assisting the closing of stuffer 50 with respect to base 30 when a wire is assembled into the base. It permits additional leverage to be applied to stuffer top plate 52. Lever 70, as depicted in FIG. 4, extends in a plane upward from the plane that includes top plate 52, allowing leverage to be readily applied, such as, for example, by a thumb or a tool.

It is desirable to lock the stuffer to the base in the engaged position shown in FIG. 4 so that the wire is not inadvertently disengaged. Any means for fastening the stuffer to the base may be used. In a preferred embodiment, the base assembly includes a detent assembly 90, FIG. 4, comprising a detent node 92 and a detent slot or depression 94 that accepts the node 92. As shown in FIG. 4, the detent node 92 is positioned in the base sidewalls and the detent slot 94 is located in ribs 62 of the stuffer 50. However the detent slot 94 could also be located in the stuffer sidewalls 54 with the detent nodes 92 positioned on the base sidewalls 34 opposite the position indicated in FIG. 4. Also, the detent nodes 92 could be located on the stuffer sidewalls and the slots 94 on the base sidewalls 34. Myriad arrangements are possible. However, the force holding the detent node 92 in position with the detent slot, however arranged, should be sufficient to keep the stuffer in position once closed in the event that the wire should attempt to be moved upward due to thermal cycling or inadvertent movement of the wire. This arrangement allows for multiple opening and closing of the solar grounding clip 20.

Figure 5:
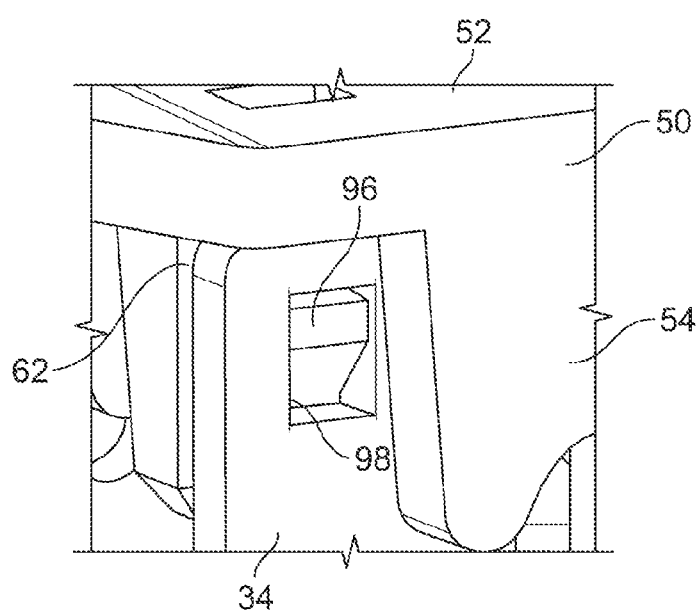
FIG. 5 is a side view of an alternative fastening arrangement for securing the base to the stuffer of the solar grounding clip of the present invention.

An alternate locking arrangement is shown in FIG. 5. In this arrangement, a tab with a bias on one of the either the base sidewalls 34 or the stuffer sidewalls 54 snaps into an aperture on the remaining of either the base sidewalls 34 or the stuffer sidewalls. As shown in FIG. 5, a biasing tab 96 is positioned on each of stuffer ribs 62 and are biased into a slot 98 in each adjacent base sidewall 34. Any other locking means may be used. For example, a removable clip may be used to lock the base with respect to the stuffer. The clip can be integral with one of the stuffer 50 or the base 30, or it could be a separate part. A locking pin may be inserted across the parts, the locking pin on a lanyard. A latch mechanism between the base plate and the stuffer that engages on closing the stuffer may also be used. Thus, it should be clear to those skilled in the art that the specific locking arrangement is not important, and any suitable locking arrangement, either permanent or relockable, may be used.

It is even possible to remove the pivot pin 80 and have a locking arrangement at either end of the solar ground clip 20. The stuffer 50 and base 30 having all of the above described features except for the pivoting capability are provided as separate parts. In this circumstance, the stuffer 50 is pressed into position over the base 30 after a wire has been inserted into base 30 as described, and a locking arrangement captures the stuffer 50 with respect the base 30 at either end using one or more of the locking arrangements described above.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A connector for capturing a wire, comprising:
   a base, the base further comprising a conductive metal and having,
   a base plate, the base plate including means for assembling the base to a panel,
   a pair of opposed sidewalls extending at an angle from the base plate, each sidewall including a plurality of slots arranged as opposed pairs of preselected size, each opposed pair being of a different size so that each base can accommodate a plurality of wires of preselected sizes in the slots;

a stuffer, the stuffer mounted to the base, the stuffer further comprising, a top surface, a pair of opposed sidewalls extending from the stuffer top surface toward the base plate, each stuffer sidewall having slots corresponding to the slots in the base sidewalls, each opposed stuffer sidewall being adjacent to a base sidewall; and means for fastening the stuffer with respect to the base, wherein the slot in each of the stuffer sidewalls urges the wire against the corresponding slot in the base sidewalls, exerting a force on the wire sufficient to establish electrical contact between the wire and the base.

2. The connector of claim 1 wherein the opposed sidewalls of the base plate extend at an angle of about 90° toward the stuffer.

3. The connector of claim 1 wherein the pair of base plate sidewall slots include a first, lower U-shaped opening and a second opening having a width greater than the first, lower U-shaped opening.

4. The connector of claim 1 wherein the plurality of opposed pairs of slots can accommodate at least two wire sizes selected from the group of wire sizes consisting of 4 gauge, 6 gauge, 8, gauge, 10 gauge, 12 gauge, 14, gauge, 16 gauge 18 gauge and 20 gauge.

5. The connector of claim 1 wherein the means for fastening the base plate to the panel includes an aperture in the base plate and a self-tapping aluminum screw.

6. The connector of claim 1 wherein the means of fastening the stuffer to the base includes a detent assembly wherein the detent assembly includes a detent node in one of the base and the stuffer and a mating detent slot in the other of the base and the stuffer.

7. The connector of claim 1 wherein the stuffer further includes a lever extending from the stuffer top surface.

8. The connector of claim 1 wherein the opposed sidewalls of the stuffer top surface extend at an angle of about 90° toward the base.

9. The connector of claim 1 wherein the opposed sidewalls of the stuffer top surface are separated by a distance different than the opposed sidewalls of the base plate so that the opposed sidewalls of the stuffer do not interfere with the opposed sidewalls of the base plate when the stuffer is in the engaged position.

10. The connector of claim 1 wherein the opposed sidewalls of the stuffer are separated by a distance less than the distance separating the opposed sidewalls of the base plate.

11. The connector of claim 1 wherein the stuffer is pivotally mounted to the base.

12. The connector of claim 1 wherein the base is comprised of metal.

13. The connector of claim 12 wherein the base is comprised of stamped metal.

14. The connector of claim 12 wherein the base is comprised of a tin-plated copper alloy.

15. The connector of claim 1 wherein the stuffer is comprised of an insulative material.

16. The connector of claim 15 wherein the insulative material comprising the stuffer includes a resilient plastic.

17. A grounding system for a solar module comprising:

a solar module having a frame;

a wire of preselected size having an end connected to ground;

a grounding clip, the grounding clip attached to the frame of the solar module, the grounding clip further comprising a base, the base further comprising a conductive metal and having, a base plate, the base plate including means for assembling the base to a panel, a pair of opposed sidewalls extending at an angle from the base plate, each sidewall including a plurality of slots arranged as opposed pairs of preselected size, each opposed pair being of a different size so that each base can accommodate a plurality of wires of preselected sizes in the slots, a stuffer, the stuffer mounted to the base, the stuffer further comprising, a top surface, a pair of opposed sidewalls extending from the stuffer top surface toward the base plate, each stuffer sidewall having slots corresponding to the slots in the base sidewalls, each opposed stuffer sidewall being adjacent to a base sidewall, means for fastening the stuffer with respect to the base;

means for fastening the grounding clip to the solar module; and wherein the wire of preselected size extends through the slots in each of the base sidewalls, the wire contacted by the stuffer, urging the wire into the slots to establish electrical contact between the wire and the base.

18. The grounding system for a solar module of claim 17 wherein the means for fastening the grounding clip to the solar module includes an aperture in the base plate and a self-tapping aluminum screw that extends into the solar module frame.

19. The grounding system for a solar module of claim 17 wherein the self-tapping aluminum screw extends into and through the solar module frame.

* * * * *